United States Patent
Lin et al.

(10) Patent No.: US 11,457,506 B2
(45) Date of Patent: Sep. 27, 2022

(54) ADAPTIVE MULTIPATH ROUTING FAILURE RECOVERY IN A WIRELESS NETWORK

(71) Applicant: Carrier Corporation, Palm Beach Gardens, FL (US)

(72) Inventors: Chih-Kuang Lin, Clonee (IE); Davide Villa, Cork (IE); Adam Kuenzi, Silverton, OR (US); Michael Lang, Oregon City, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/106,703

(22) Filed: Nov. 30, 2020

(65) Prior Publication Data
US 2021/0168903 A1 Jun. 3, 2021

(30) Foreign Application Priority Data
Dec. 2, 2019 (EP) .................................... 19212953

(51) Int. Cl.
*H04W 84/18* (2009.01)
*H04L 45/28* (2022.01)
*H04W 40/28* (2009.01)

(52) U.S. Cl.
CPC ............. *H04W 84/18* (2013.01); *H04L 45/28* (2013.01); *H04W 40/28* (2013.01)

(58) Field of Classification Search
CPC . H04L 41/0654; H04L 41/0659; H04L 45/00; H04L 45/12; H04L 45/121; H04L 45/122; H04L 45/123; H04L 45/124; H04L 45/128; H04L 45/16; H04L 45/20; H04L 45/22; H04L 45/24; H04L 45/28; H04W 40/28; H04W 84/18
See application file for complete search history.

(56) References Cited

U.S. PATENT DOCUMENTS

| 835,133 A | 11/1906 | Greenough |
| 7,668,173 B2 | 2/2010 | Zhao |

(Continued)

OTHER PUBLICATIONS

European Search Report for Application No. 19212953.4; dated May 13, 2020; 7 Pages.

(Continued)

*Primary Examiner* — Kan Yuen
(74) *Attorney, Agent, or Firm* — Cantor Colburn LLP

(57) ABSTRACT

A method for operating a wireless network including a plurality of nodes, the method including: each node generating a set of paths to a head node; initiating an adaptive failure recovery method in the event of a source node sending a message data packet upstream and a discovery node encountering a failed node, wherein the discovery node is a node on a path taken by the message data packet from the source node to a destination node, the adaptive recovery failure method including: collecting, at the discovery node, relevant data, the relevant data comprising: a hop-distance between the failed node and the source node; a count of estimated extra hops required to deliver the data packet using a hop-distance recovery method; a count of estimated extra hops required to deliver the data packet using a multipath recovery method; and a latency time for the hop-distance recovery method.

15 Claims, 1 Drawing Sheet

(56) References Cited

U.S. PATENT DOCUMENTS

| | | | |
|---|---|---|---|
| 9,584,362 B2 | 2/2017 | Lim et al. | |
| 2002/0101869 A1 | 8/2002 | Garcia-Luna-Aceves et al. | |
| 2005/0259570 A1* | 11/2005 | Hayashi | H04L 45/00 |
| | | | 370/216 |
| 2009/0296704 A1 | 12/2009 | Km et al. | |
| 2010/0220653 A1 | 9/2010 | Hwang et al. | |
| 2012/0327792 A1 | 12/2012 | Guo et al. | |
| 2017/0078222 A1* | 3/2017 | Yamashita | H04L 45/22 |
| 2021/0153097 A1* | 5/2021 | Du | H04W 40/10 |

OTHER PUBLICATIONS

Motiwala Murtaza et al. "Path Splicing" SIGCOMM '08 Proceedings, ACM, Seattle, Washington, Aug. 17, 2008, 12 Pages.

\* cited by examiner

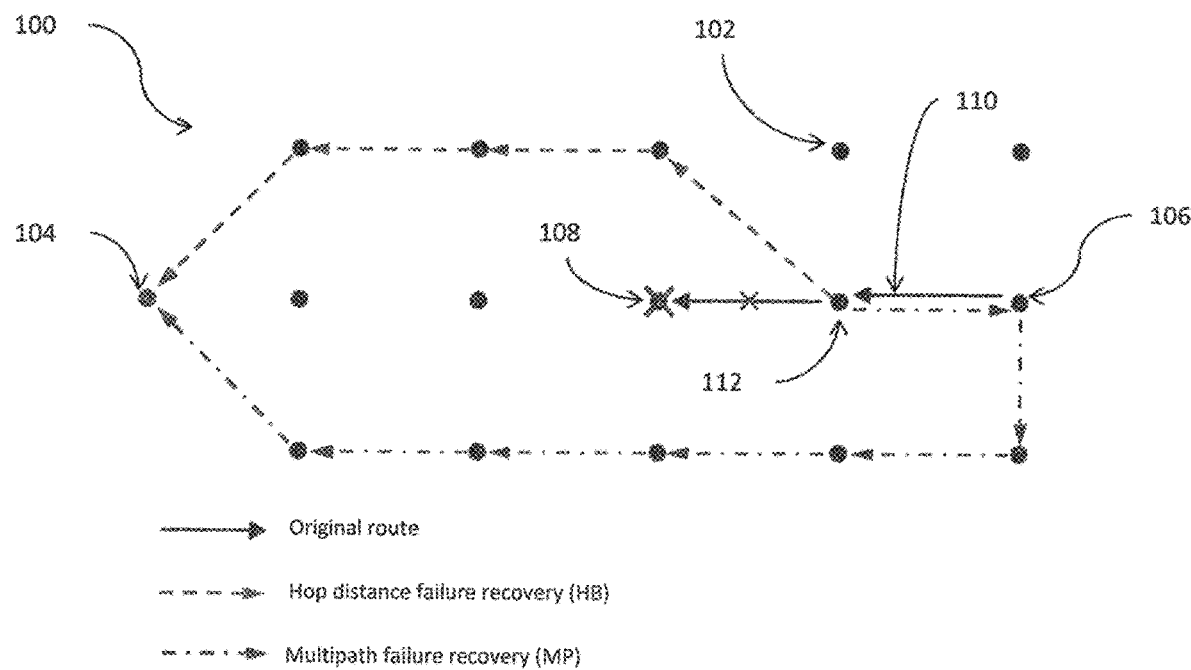

ADAPTIVE MULTIPATH ROUTING FAILURE RECOVERY IN A WIRELESS NETWORK

FOREIGN PRIORITY

This application claims priority to European Patent Application No. 19212953.4, filed Dec. 2, 2019, and all the benefits accruing therefrom under 35 U.S.C. § 119, the contents of which in its entirety are herein incorporated by reference.

TECHNICAL FIELD OF INVENTION

The present disclosure relates to wireless multi-hop networks, in particular to the creation of multipath routes in a wireless network and to the optimisation of adaptive failure recovery in such networks.

BACKGROUND OF THE INVENTION

The Bluetooth® Low Energy (BLE) specification is a set of standards for wireless network technologies operating within the 2.4-2.4835 GHz Industrial, Scientific and Medical (ISM) band. BLE is designed to considerably reduce power consumption compared to legacy, or "Classic", Bluetooth® devices.

Applications for the BLE specification include healthcare, security, fitness, and home entertainment. Within these applications, devices may utilise Bluetooth mesh profiles to communicate with other BLE devices in a network. Each device in the network can transfer data between other devices in the network, creating a so-called "mesh".

According to the specification, a BLE device operates across 40 channels in the 2.4 GHz band, each mapped onto a set of RF (radio frequency) channel index values 0, 1, . . . , 39. Channels 0 to 36 are used for the transmission of data while channels 37, 38, and 39 are for the transmission of advertising (ADV) events.

The term "node" as used herein may refer to any device that may have BLE capability. Such devices may include smartphones, smart plugs, light bulbs, laptops, home entertainment devices or any other device that can connect to a BLE network. A node may also be able to communicate in other wireless networks, such as Wi-Fi® networks or cellular networks. A node may also be able to communicate via the Internet through such networks.

SUMMARY OF THE INVENTION

Viewed from a first aspect, the present invention provides a method for operating a wireless network comprising a plurality of nodes, the method comprising: each node generating a set of paths to a head node; initiating an adaptive failure recovery method in the event of a source node sending a message data packet upstream and a discovery node encountering a failed node, wherein the discovery node is a node on a path taken by the message data packet from the source node to a destination node, the adaptive recovery failure method comprising the steps of: collecting, at the discovery node, relevant data, the relevant data comprising: (a) a hop-distance between the failed node and the source node; (b) a count of estimated extra hops required to deliver the data packet using a hop-distance recovery method; (c) a count of estimated extra hops required to deliver the data packet using a multipath recovery method; and (d) a latency time for the hop-distance recovery method; comparing, at the discovery node, the hop count distance between the failed node and the source and latencies of the hop-distance recovery method and the multipath recovery method calculated from the relevant data; and depending on the comparison, selecting the hop-distance recovery method or the multipath recovery method.

Viewed from a second aspect, the invention provides a wireless network comprising a plurality of nodes, the plurality of nodes comprising: a head node; and a source node, wherein the plurality of nodes are configured to generate a set of paths to the head node; wherein, in the event of the source node sending a message data packet upstream and a discovery node encountering a failed node, wherein the discovery node is a node on a path taken by the message data packet from the source node to a destination node, the discovery node is configured to initiate an adaptive failure recovery method comprising the steps of: collecting, at the discovery node, relevant data, the relevant data comprising: (e) a hop-distance between the failed node and the source node; (f) a count of estimated extra hops required to deliver the data packet using a hop-distance recovery method; (g) a count of estimated extra hops required to deliver the data packet using a multipath recovery method; and (h) a latency time for the hop-distance recovery method; comparing, at the discovery node, latencies of the hop-distance recovery method and the multipath recovery method calculated from the relevant data; and depending on the comparison, selecting the hop-distance recovery method or the multipath recovery method.

Viewed from a third aspect, the invention provides a computer program product containing instructions that, when executed within a Bluetooth Low Energy network comprising multiple nodes, will configure the network to operate in accordance with the method of the first aspect.

The following describes optional features that may be combined with the method of the first aspect, the network of the second aspect or the computer program product of the third aspect.

The BLE devices may include any device that has the ability to communicate with other devices using Bluetooth low energy transmissions. Such devices may include smartphones, smart plugs, light bulbs, laptops, access control systems, and home entertainment devices. BLE devices may be members of a BLE network. The BLE network may comprise a head node or gateway, where the head node is able to perform protocol conversions communicate data from the BLE network to another network that the head node is connected to. Other networks may include cellular networks, the Internet, a local intranet, and cloud networks.

In the BLE network, the BLE devices that are members of the network may be called nodes. The network may comprise any number of nodes and may be distributed so that the head node is connected to at least one node. Each node in the network may be connected directly to the head node or is connected to the head node via at least one other node. In this way, the head node is able to communicate with all nodes in a BLE network, and vice versa.

All nodes in the network may be considered to be downstream or downlink with respect to the head node and, conversely, the head node may be considered upstream or uplink of other nodes in the network. The structure of the network may be that data can travel from the head node and through other intermediary nodes before reaching a destination node. In this way, intermediary nodes may be upstream of some nodes and may be downstream of other nodes. A node that is at the edge of a network may be called an end node. Data that is transmitted from the head node to an intermediary node or end node may be considered to be travelling downstream or downlink. Data that is transmitted from an end node or intermediary node in the direction of the head node may be considered to be travelling upstream or uplink. A head node may also be termed a "sink node".

The BLE network may be configured to allow BLE devices to join and leave networks on the fly. The skilled person would readily understand that BLE networks may be configured to be restructured to account for new devices joining the network or current devices leaving the network. The skilled person would also readily understand that a BLE network may be configured to restructure itself to account for changes in the physical location of BLE devices in the network and/or optimise the network for efficient data transfer between devices.

The distance any particular node is away from the head node may be defined by the number of nodes data must travel through to reach that particular node. For example, a node that directly communicates with the head node may be considered one "hop" away from the head node. Likewise, a first node that communicates with the head node via a second node may be considered to be two "hops" away from the head node. In this latter case, the second node may be considered to be downstream of the head node and also upstream of the first node. In this way, it is possible to define how many hops any particular node is away from the head node. The number of hops has no bearing on the physical distance between nodes. Nodes that are one hop away from a particular node may be called neighbours of that particular node.

The hop distance for a particular node may change due to a reconfiguration of the network. Such a reconfiguration may occur for any number of reasons including, but not limited to: optimisation of the network; in response to the number of nodes in the network changing; and the physical movement of nodes in the network.

The hop distance for a particular node may be stored in the memory of said node as identifying data for that node. Other identifying data may include a node ID (identification) number or a MAC (media access control) address for the node. The node may store identifying data for other nodes in the network, such as neighbouring nodes. The node ID may be a unique identification of the node.

A path between two connected nodes may be part of a longer path from an initial sending node to a destination node, where the sending node may be considered as a node from which a data packet originated. Alternatively, the sending node may be considered as any node from which data was sent. The destination node may be considered to be a node to which a data packet is intended to reach. Alternatively, a destination node may be any node that receives a data packet. The path for a data packet may comprise multiple hops through multiple nodes to reach a destination node. The node(s) on a path between a sending node and a destination node may be called intermediary nodes. The terms "path" and "route" may be used interchangeably.

Typically, a path between a sending node and a destination node may require as few intermediary nodes as possible, and may not even require any intermediary nodes at all. There may be multiple paths from any one node in the network for data to be sent along to reach a destination node. A node would typically select a path based upon the lowest hop count, but may also determine which path to use by considering other parameters.

Before a path is created from a source node, the source node collects data relating to its one-hop neighbour nodes. The data may include but is not limited to unique node identification, minimum hop distance to the head node, and energy metrics. This data may be collected upon receipt of an advertisement packet from a one-hop neighbour node or from data collected on previous occasions.

Each route set-up is carried out in a hop by hop manner and with a specific purpose in mind. The purpose may be the shortest route to a destination node or the most energy efficient route or any other suitable goal. Paths may only be generated between source nodes and the head node as the head node serves as a data sink. Multiple paths may be derived using optimization methods. For example, the greedy algorithm is a simple and iterative method that is used to solve the routing path search. While the greedy algorithm is one example of an optimisation method, other optimisation methods for path creation in wireless methods are known and may be used instead or in addition to the greedy algorithm. This method is proved to achieve the near-optimal result with low cost. The paths may have any number of intermediary nodes, where an intermediary node is a node along a path between a source node and a destination node. Paths may or may not share intermediary nodes. "Joint" paths are those in which parts of the paths share the same intermediary nodes. "Disjoint" paths are those in which no intermediary nodes are shared between any two disjoint paths. Paths may also be a mixture of joint and disjoint, meaning that paths share some intermediary nodes but not others. The greedy algorithm may iteratively derive multiple disjoint paths.

An advantage of the multipath generation method above is that an optimal set of the shortest paths between the source node and the destination node are created using local node data. An additional advantage is that, if a failed node is discovered during upstream and downstream data delivery, the multipath set-up method guarantees that alternative paths would be available which do not contain the failed node due to the disjoint nature of some of the alternative paths.

The greedy search algorithm may have a primary objective of creating multiple disjoint paths having as few hops as possible. In literature, a greedy algorithm is a paradigm that builds the final outcome gradually by selecting a series of solutions, wherein each solution is selected depending on which solution offers the best benefit at the time the solution is selected. These approaches may not always be optimal, but with sufficient information it is possible to reach the optimal solution.

When executed at a node, the multi-path algorithm may exploit local information at the node, such as one-hop neighbour IDs and hop counts, and the greedy search algorithm itself to find the best next hop to create the paths. Therefore, nodes in the network may be configured to store information that is used by the greedy algorithm and the multi-path method for at least the amount of time in which the algorithm or method is run. This has an advantage of reducing latency and may guarantee the proper outcome.

The greedy algorithm may exploit a time-to-live (TTL) value stored within a path creation data packet. The TTL value is initialized by a source node of the path creation data packet and decreases at each hop in order to follow the objective function of the minimal number of nodes. A node may use the TTL value to retrieve of a list of one-hop neighbours having a hop distance less than or equal to that of the TTL value, and so may be determined to be uplink or downlink of the node at which the path creation data packet is currently at. Thus, the downlink routes may be inferred from the uplink ones.

Additionally, a number of other structures and messages may be exploited by the greedy algorithm:

Link layer ack: this message is a link layer acknowledgement sent after a data packet has been received at a node. It means that the data packet has been received and accepted successfully.

Link layer nack: this message is a link layer negative acknowledgement and may be sent instead of a link layer ack. A node may decide to send a link layer ack or nack after a data packet has been received. A nack being sent means that the data packet has been correctly received but the receiving node has not accepted the path creation request.

Routing ack: the routing acknowledgement is a stand-alone message generated by the final destination node and sent back to the source node to notify the source node that a path was successfully created.

Routing nack: the routing negative acknowledgement is a stand-alone message generated by an intermediate node and sent to the source node in order to notify the source node that the intermediate node does not have any other one-hop neighbours to forward the path creation data packet to in order to continue the path creation.

PermExcluded list: this list may be unique for each node and contains the one-hop neighbours that are to be avoided in the next hop selection for any particular source node. This list may be updated during the running of the algorithm.

TempExcluded list: This second list may also be unique for each node. It contains a list of one-hop neighbours that are to be avoided in the next hop selection for any particular source node combined with a maximum TTL value. This means that a node may select a second node for a next hop if the second is on the TempExcluded list if the TTL value of the path creation data packet is higher compared to the one stored on the list for that next hop. As with the PermExcluded list, the TempExcluded list may be updated during the running of the algorithm.

The greedy algorithm may also cause nodes to store previous path data at their one-hop neighbours. This has an advantage of reducing the latency and energy costs of future multipath setups.

Adaptive failure recovery is an adaptive selection of two failure recovery techniques: multipath recovery and hop-distance recovery. This is triggered by the discovery of a failed node during an uplink delivery. That is, data is being sent from a source node towards the head node. The node that discovers the failed node may be termed a "discovery node". The discovery node may be any node in the network that discovers a failed node. The adaptive failure recovery allows the discovery node to analyse which of the hop-distance recovery and the multipath recovery methods are most efficient to use in the event that a failed node is encountered.

The two available methods to the adaptive failure recovery methodology each have a latency associated with them. This is the amount of time taken for each method to be carried out. Each method has a number of steps from which the latency may be derived.

A set of values may be defined for use in calculating the latency of each method. These values may be as follows:

Z is the hop distance between the sink node and the source node of a message data packet.

X is the hop distance between the failed node and the source node.

α is the estimated number of extra hops required for the hop-distance recovery method to deliver the message data packet.

β is the estimated number of extra hops required for the multipath recovery method to deliver the path creation data packet.

r is an extra latency amount required to perform one-hop neighbour discovery in the hop-distance recovery method.

The multipath recovery method has a latency composed of four parts:

The time required to travel from the source node till the node discovers a failure. This value may be represented by X−1.

The time to detect a failure.

The time to travel back from the discovery node which detected the failure to the source node. This time is the same as the first step and so also has a value of X−1.

The time to reach the sink node via the next multi-route recovery. This value is the time taken between the source node and the sink node, plus the extra hops of a new path. This is represented by the value Z+β.

Therefore, an increase of the hop distance of the failed node leads to a decrease in the latency of the first and third parts, while the second and fourth contributing parts remain the same. Hence, a failed node further away from a sink node has a reduced latency for the multipath recovery method compared to a failed node close to the sink node.

The hop-distance recovery method also has a latency composed of four parts:

The time required to travel from the source node till the node discovers a failure. This value may be represented by X−1.

The time to detect a failure.

The time to perform the one-hop neighbour discovery by the node detecting the failed node. This is the latency for the discovery node to perform a one-hop neighbour discovery to learn the latest information from one-hop neighbouring nodes relating to their minimum hop distances toward head node and any other relevant information. This is represented by the r value.

The time to reach the sink node via the node discovered in the previous step using its predefined multi-path routing table. This value is the time taken to travel between the sink node and the current node, plus any extra delay derived from the extra hops of the new path. This is represented by the value Z−X+1+α.

Therefore, an increase in the hop distance of the failed node leads to a decrease in the latency value of the first part and an increase in the value of the fourth part. But, as these changes are the same, and as the latency values are unchanged for the second and third parts for a change in failed node hop distance, the overall latency value of the hop-distance recovery method is unchanged. Instead, it is just the distribution of the latency that changes.

So in the hop-distance recovery method, when the discovery node has retrieved the neighbouring info regarding their hop distances it will choose the next hop by selecting the neighbour with the minimum hop distance. Then, after the first selection based on the minimum hop-distance through neighbour discovery, the second node may select the next hop by exploiting an alternative upstream path previously built. This may be done because it can be assumed that the nodes do not store the neighbouring info regarding the hop distance. Therefore, exploiting an existing alternative path after the first selection may be more convenient and less costly than to perform each time the neighbour discovery. The first selection based on the hop-distance may be enough to bypass the current failed node.

Taking into consideration both of the failure recovery methodologies together, the first two parts of the latencies for each method are the same. To determine which of the two latencies are lower, and therefore which of the two methods should be prioritised by any particular node, one should examine and compare the last two contributions to latency for each of the methods.

Two equations may be derived from these comparisons:

$$HB = r + Z - X + 1 + \alpha,$$

$$MP = Z + X - 1 + \beta,$$

where HB is the latency for the hop-distance recovery method and MP is the latency for the multipath recovery method. These values representing the latency are in units of hops or time unit, and may be converted into seconds by multiplying each value by the estimated time to perform a single hop delivery $\gamma$.

The values of Z and X may be retrieved at a node by checking the TTL of the message data packet, which may give information regarding the number of hops that the message has taken from the source node to the discovery node. X may be computed by adding one to the TTL value. Z may be computed by adding the hop distance of the discovery node to the TTL value. The remaining three parameters may be estimated by the discovery node based upon local information and the overall network state by selecting the most appropriate numbers.

The $\alpha$ and $\beta$ values may be estimated on average in the range 0 to 4, though this range may be different. These values may instead be dependent on the network density or node topology, or on whether there are multiple simultaneously failed nodes. A discovery node may estimate these values on its own or through local collaboration, or they may be decided in the design phase of the system. They may also change over time depending on new information collected in real time if nodes are configured to perform these kinds of calculations. An old network may be more likely to have failed nodes, in which case the average values for $\alpha$ and $\beta$ may be higher.

The r value may be strongly related to the timer used for the neighbour discovery step in the hop-distance recovery method. The neighbour discovery may be performed for two main reasons: firstly, the discovery nodes may not store the information regarding the minimum hop distances toward the head node of its one-hop neighbours; and secondly, it allows a discovery node to collect the latest neighbouring information. Therefore, the discovery node ensures that information on its one-hop neighbours is up to date and the discovery node may then select the next-hop node properly. The r value may depend on network density in that there may be a greater number of neighbours to be discovered. A node may retrieve the r value during its preliminary phase operations. The hop-distance recovery method may only exploit the neighbour discovery step with the discovery node. Then, the next-hop node may simply select one of the existing paths available to that node for the message data packet to continue to its destination.

While it is possible to calculate, at the discovery node, the latency of each of these methods to directly compare them and make a decision based on this comparison, a different comparison is made at the discovery node to determine which of the two methods is more efficient. The choice of the two recovery methods is instead dependent on the hop distance between the failed node and the source node and other parameters, e.g., network topology, traffic condition, neighbour discovery delay, etc.

The inequality that determines the method selection may be determined in the event that there is only one failed node and may be expressed as follows:

$$X > (r + \alpha + 2 - \beta)/2.$$

If this strict inequality holds true, then the latency of the hop-distance recovery method is less than that of the multipath recovery method. In this event, the hop-distance recovery method may be selected by the adaptive failure recovery method and the failed node is circumvented using this method.

If this strict inequality holds true, then the latency of the hop-distance recovery method is less than that of the multipath recovery method. In this event, the hop-distance recovery method may be selected by the adaptive failure recovery method and the failed node is circumvented using this method.

Alternatively, if the strict inequality is false, then the latency of the multipath recovery method is less than that of the hop-distance recovery method. In this event, the multipath recovery method may be selected by the adaptive failure recovery method and the failed node is circumvented using this method instead. The multipath recovery method may not be able to be carried out if each node has not previously built a set of multiple routes.

An advantage of adaptive failure recovery is to reduce latency and to save resources in the network by deriving an optimal selection between the hop-distance and multipath recovery methods.

The adaptive failure methodology may be extended to incorporate multiple simultaneously failed nodes. To do so, the discovery node that detects a failed node initiates the adaptive failure recovery method based on its current position and local information. The values for Z, X, $\alpha$, and $\beta$ may then change accordingly. In this situation, in which more than one simultaneously failed nodes are present, the hop-distance recovery method may work better than the multipath recovery method. This may be due to the multipath recovery method choosing an alternative path containing a failed node. This may not necessarily mean that the hop-distance recovery method is always preferable, but in extreme cases with poor networks, it may be preferable to weight the choice of the hop-distance recovery method higher than the multipath recovery method. In this situation, the r value may be counted multiple times to account for the time needed by nodes to successfully derive the next-hop node and navigate a path to a destination node using the neighbour discovery multiple times.

The network may be a hotel security network, in which nodes may be locking mechanisms for hotel room doors. In this example, the head node or sink node may be a Room Management Service (RMS) node. This refers to the head node in a hotel, wherein each room has a RMS/head node. The node network in a hotel may contain a large number of nodes and, as such, allows for the creation of a large number of different and distributed paths. The hotel network may also comprise multiple RMS nodes, each managing one or more rooms.

The BLE nodes might be any suitable known type of device, and they may be modified compared to the known devices to operate in accordance with a method as set out above. A BLE device may comprise a processor or processing circuitry, a memory unit, a radio, and an antenna. Computer program products for performing the methods described herein may be stored as an application in the memory unit. The memory unit may be a hard drive, solid state or optical memory source. The processor or processing circuitry may be configured to access and execute software, applications, and data stored on the memory unit.

The radio may be configured to receive and transmit BLE signals via the antenna. The processor or processing circuitry may be configured to interface with the radio and the application may be configured to control the radio and antenna when executed on the processor or processing circuitry.

BRIEF DESCRIPTION OF THE DRAWINGS

Certain embodiments of the disclosure will now be described by way of example only and with reference to the accompanying drawings in which:

FIG. 1 is an example network with multiple nodes.

DETAILED DESCRIPTION

FIG. 1 shows an example network 100 comprising a plurality of nodes 102, the plurality of nodes 102 including a head node 104, a source node 106, and a failed node 108. The network is configured to carry out a multi-path creation algorithm to create a plurality of paths between nodes in the network and the head node. Prior to initialization of this algorithm, individual nodes may be configured to collect information about their one-hop neighbouring nodes. This information may include unique node IDs, hop distances, and energy metrics, and may be and are received at each node by receiving advertising data packets or by using previous neighbour data collections.

Upon initialization of the multi-path creation algorithm, route set-up is carried out by each node. Each route set-up is carried out in a hop by hop manner and with a specific purpose in mind. The purpose may be the shortest route to a destination node or the most energy efficient route or any other suitable goal. Multiple paths are derived using optimization methods. For example, the greedy algorithm is a simple and iterative method that is used to solve the routing path search. The code used to implement the greedy search algorithm is as follows:

1: procedure ORIGINAL SOURCE OPERATIONS
2: maxTTL=1, nPaths=0, maxPaths=K;
3: if nPaths<maxPaths then
4: generate a status message with TTL=maxTTL, goto 14;
5: else
6: end path creation;
7: if there are still neighbours to select with HopDistance>=TTL Or in TempExcluded then
8: maxTTL++, TTL=maxTTL, goto 14
9: else
10: delete status message, end path creation;
11: if routing ack received then
12: nPaths++, goto 3;
13:
14: procedure SENDING OPERATIONS
15: select neighbour with min hopDistance<TTL & !(PermExcluded) & !(TempExcluded);
16: if more than one neighbour then
17: select node in the same subnet with best RSSI;
18: if no nodes in the same subnet then
19: select node in another subnet with best RSSI;
20: send status packet, goto 27;
21: else if no neighbours available then
22: if original source then
23: goto 7; 24: else
25: send back a routing nack, goto 40;
26:
27: procedure RECEIVING OPERATIONS
28: if status message received & receiver node is an RMS then
29: if the RMS is in a previous path & the original source distance is 1-hop then
30: send link layer nack, goto 38;
31: else
32: send link layer ack, delete status message, send back routing ack, goto 11;
33: else if status message received & receiver is not an RMS then
34: if the node is in a previous path Or it does not have any neighbour available then
35: send link layer nack, goto 38;
36: else
37: send link layer ack, TTL--, goto 14;
38: if link layer nack received then
39: add neighbour in PermExcluded Or TempExcluded, goto 14;
40: if routing nack received then
41: add neighbour in TempExcluded, TTL++, goto 14;

The steps for the algorithm are divided into three sections: the first contains the unique operations performed by the source node which is trying to create a path; the second identifies the sending operations performed by a node which currently owns the path creation data packet; and the third section which summarises receiving operations performed by an involved node. The involved node is any node which is a next-hop candidate during path creation.

At line 7, the TTL value is increased by one whenever the source node does not have any one-hop neighbours which satisfy the main condition of hopDistance<TTL with the current TTL value. By increasing the TTL value, the nodes in the TempExcluded lists may become a potential next-hop node to be selected. In contrast, the nodes in the PermExcluded lists still may never be selected as next-hop nodes once they are stored on the list, at least until the list is updated and they are subsequently removed.

The selection of the next-hop node performed between lines 15 and 19 chooses the one-hop neighbour that has the minimum hop distance which is also lower than the current TTL value and whose unique node ID is not on either of the PermExcluded or TempExcluded lists. If there is more than one node that satisfies these constraints, the next-hop node is prioritised based on whether it is in the same subnetwork as the current node and on its RSSI value. If there are no nodes in the same subnetwork, then the choice falls on a node in another subnetwork with the best RSSI. These constraints regarding the selection of the node may only apply in cases where one than one node satisfies the conditions for selection of the best next-hop node and the constraints may change based on the policy of the system and network. They may also include parameters such as: node energy remaining (i.e. battery life), workload, and traffic congestion. Other parameters characteristic of the node may also serve as basis for selection prioritisation.

When a sink node, which may be the head node, receives the path creation data packet on line 29, the sink node accepts the packet by sending a link layer ack reply if the sink node is not in a previous path or if the sink node is In a previous path but the distance between the current sink node and the source node is not one hop. In other cases, the sink node is configured to send a link layer nack. The second of the two conditions for sending a link layer ack is included because, if true, it means that the sink node already has a direct on-hop path with the source node built in a previous route. This direct path would be chosen over a path being currently built as it predates the path being built and it is unlikely that the source node cannot communicate with this sink node directly while a longer path is available.

When the receiver is not a sink node, as shown on line 33, the receiving node will accept the path creation data packet by replying with a link layer ack or a link layer nack. The greedy algorithm shown is configured to create disjoint paths only. Therefore, the receiving node will reply with a link layer ack if the receiving node is in a previously created path and the receiving node has at least one neighbour to send the data packet on to. If this condition is not met, then the receiving node sends a link layer nack. The nack contains a flag in order to inform the sending node of the reason for refusing the path creation data packet, and the sending node may add the unique ID of the receiving node to one of the PermExcluded or TempExcluded lists, shown at line 39. The unique ID of a receiving node may be added to the PermExcluded list by the sending node if the receiving node is already in a previously created path or if the receiving node's one or more neighbours are all on the PermExcluded list. The sending node may add the unique node ID of the receiving node to the TempExcluded list if the receiving node does not have a neighbour available due to the TTL value of the path creation data packet being too low, in which case the TTL value of the data packet will also be recorded on the list as the receiving node may accept a path creation data packet with a higher TTL value. When a sink node sends a nack, the sink node unique ID is always inerted onto the PermExcluded list as it means that the sink node is already in a previous path with the source node being at a hop distance of one away from the sink node.

In the example network 100, a message data packet has been sent from the source node 106 towards the head node 102 following an original path 110. When attempting to be transmitted from an intermediary node 112, the intermediary node 112 discovers that the next node on the original path 110 is a failed node 108. The intermediary node may now be termed a "discovery node" 112.

The discovery node 112 is then configured to initiate an adaptive failure recovery method. This method involves calculating which of two available failure recovery methods has the smallest latency. The two methods are a hop-distance recovery method and a multipath recovery method. The adaptive failure recovery method is initiated in the event of a source node 106 sending a message data packet upstream and a discovery node 112 encountering a failed node 108.

The adaptive recovery failure method includes collecting, at the discovery node 112, relevant data. The relevant data comprises: a hop-distance between the failed node and the source node; a count of estimated extra hops required to deliver the data packet using a hop-distance recovery method; a count of estimated extra hops required to deliver the data packet using a multipath recovery method; and a latency time for the hop-distance recovery method. Latencies for each of the hop-distance recovery method and the multipath recovery method are calculated at the discovery node 112 from the relevant data and, depending on the comparison, one of the hop-distance recovery method or the multipath recovery method is selected to circumvent the failed node 108.

What is claimed is:

1. A method for operating a wireless network (100) comprising a plurality of nodes (102), the method comprising:
    each node generating a set of paths to a head node (104);
    initiating an adaptive failure recovery method in the event of a source node (106) sending a message data packet upstream and a discovery node (112) encountering a failed node (108), wherein the discovery node (112) is a node on a path (110) taken by the message data packet from the source node (106) to a destination node, the adaptive recovery failure method comprising the steps of:
    collecting, at the discovery node (112), relevant data, the relevant data comprising:
        a hop-distance between the failed node (108) and the source node (106);
        a count of estimated extra hops required to deliver the data packet using a hop-distance recovery method;
        a count of estimated extra hops required to deliver the data packet using a multipath recovery method;
        a latency time for the hop-distance recovery method; and
        a latency time for the multipath recovery method;
    comparing, at the discovery node (112), latencies of the hop-distance recovery method and the multipath recovery method calculated from the relevant data; and
    depending on the comparison, selecting the hop-distance recovery method or the multipath recovery method.

2. The method of claim 1, wherein the set of paths are a set of disjoint paths.

3. The method of claim 1, wherein the destination node is the head node.

4. The method of claim 1, wherein the discovery node retrieves the hop-distance between the failed node and the source node by checking a time-to-live (TTL) of the data packet.

5. The method of claim 1, wherein the relevant data further comprises a hop-distance between a RMS and the source node.

6. The method of claim 5, wherein the discovery node retrieves the hop-distance between the RMS node and the source node by checking a time-to-live (TTL) of the data packet.

7. The method of claim 1, wherein the count of estimated extra hops required to deliver the data packet using the hop-distance recovery method and the count of estimated extra hops required to deliver the data packet using the multipath recovery method are estimated to be within a certain range, depending on multiple factors.

8. The method of claim 1, wherein if the inequality $$X > (r + \alpha + 2 - \beta)/2$$

is satisfied, then the hop-distance recovery method is selected, otherwise the multipath recovery method is selected, where:
    X is the hop-distance between the failed node and the source node;
    $\alpha$ is the count of estimated extra hops required to deliver the data packet using a hop-distance recovery method;
    $\beta$ is the count of estimated extra hops required to deliver the data packet using a multipath recovery method; and
    r is the latency time for the hop-distance recovery method.

9. The method of claim 1 wherein the set of paths are generated using an optimization algorithm, such as a greedy algorithm.

10. The method of claim 1 wherein the latency time for the hop-distance recovery method is dependent on the density of the network.

11. The method of claim 1, wherein there is more than one failed node in the network.

12. The method of claim 1, wherein the network is for use in a hotel, and wherein the nodes are wireless devices in the hotel and the head node is a Room Management Service (RMS).

13. A wireless network comprising a plurality of nodes, the plurality of nodes comprising:

a head node; and a source node, wherein the plurality of nodes are configured to generate a set of paths to the head node;

wherein, in the event of the source node sending a message data packet upstream and a discovery node encountering a failed node, wherein the discovery node is a node on a path taken by the message data packet from the source node to a destination node, the discovery node is configured to initiate an adaptive failure recovery method comprising the steps of:

collecting, at the discovery node, relevant data, the relevant data comprising:

a hop-distance between the failed node and the source node;

a count of estimated extra hops required to deliver the data packet using a hop-distance recovery method;

a count of estimated extra hops required to deliver the data packet using a multipath recovery method;

a latency time for the hop-distance recovery method; and a latency time for the multipath recovery method;

comparing, at the discovery node, latencies of the hop-distance recovery method and the multipath recovery method calculated from the relevant data; and depending on the comparison, selecting the hop-distance recovery method or the multipath recovery method.

14. A wireless network comprising: a plurality of nodes, wherein the network is configured to operate in accordance with the method of claim 1.

15. A computer program product embodied on a non-transitory computer readable medium containing instructions that, when executed within a wireless network comprising a plurality of nodes, will configure the network to operate in accordance with the method of claim 1.

\* \* \* \* \*